(12) United States Patent
de Alvarenga Bastos (10) Patent No.: US 10,356,045 B2
(45) Date of Patent: *Jul. 16, 2019

(54) INTERCEPTING INTRA-NETWORK COMMUNICATION FOR SMART APPLIANCE BEHAVIOR ANALYSIS

(71) Applicant: Cujo LLC, El Segundo, CA (US)

(72) Inventor: Pedro de Alvarenga Bastos, Waterford (IE)

(73) Assignee: CUJO LLC, El Segundo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/377,856

(22) Filed: Dec. 13, 2016

(65) Prior Publication Data

US 2017/0180317 A1 Jun. 22, 2017

Related U.S. Application Data

(60) Provisional application No. 62/269,863, filed on Dec. 18, 2015.

(51) Int. Cl.
*H04L 29/06* (2006.01)
*H04L 29/08* (2006.01)
*H04L 29/12* (2006.01)
*H04L 12/28* (2006.01)
*H04L 12/707* (2013.01)

(52) U.S. Cl.
CPC ...... *H04L 63/0254* (2013.01); *H04L 12/2823* (2013.01); *H04L 45/22* (2013.01); *H04L 61/2015* (2013.01); *H04L 61/6095* (2013.01); *H04L 63/1425* (2013.01); *H04L 67/125* (2013.01)

(58) Field of Classification Search
CPC ............ H04L 63/0254; H04L 63/1425; H04L 61/6095; H04L 61/2015; H04L 67/12
See application file for complete search history.

(56) References Cited

U.S. PATENT DOCUMENTS

| | | | |
|---|---|---|---|
| 2005/0286518 A1* | 12/2005 | Park | H04L 29/12783 370/389 |
| 2007/0064689 A1* | 3/2007 | Shin | H04L 61/103 370/389 |

(Continued)

OTHER PUBLICATIONS

PCT International Search Report and Written Opinion, PCT Application No. PCT/US16/66406, dated Feb. 27, 2017, 14 pages.

*Primary Examiner* — Noura Zoubair
(74) *Attorney, Agent, or Firm* — Fenwick & West LLP (57) ABSTRACT

A system and method for intercepting intra-network traffic for smart appliance behavior analysis. A network traffic hub is configured to intercept network traffic between a switch and a router. A smart appliance sends a message to the router, such as a DHCP request when the smart appliance joins the network. The router sends a response to the smart appliance. The network traffic hub intercepts and modifies the response to instruct the smart appliance to send all future intra-network traffic through the network traffic hub and the router. In some embodiments, the network traffic hub alters a network mask in the response message to instruct the smart appliance to send traffic through the network traffic hub. The network traffic hub then extracts data from the network traffic and uses that data for behavior analysis of smart appliances.

11 Claims, 4 Drawing Sheets

(56) References Cited

U.S. PATENT DOCUMENTS

2008/0307079 A1    12/2008  Choi et al.
2015/0020188 A1*  1/2015  Segal .................. H04L 63/0227
                                                             726/13
2015/0358285 A1    12/2015  Ellard et al.

* cited by examiner

FIG. 4 though a network traffic hub is configured to
INTERCEPTING INTRA-NETWORK COMMUNICATION FOR SMART APPLIANCE BEHAVIOR ANALYSIS

CROSS-REFERENCE TO RELATED APPLICATIONS

This application claims the benefit of U.S. Provisional Patent Application No. 62/269,863, entitled "Intercepting Intra-Network Communication for Smart Appliance Behavior Analysis" and filed on Dec. 18, 2015, the content of which is incorporated by reference herein in its entirety.

BACKGROUND

Field of Art

The disclosure generally relates to the field of network security analysis and specifically relates to intercepting intra-network communication for analysis.

Description of Art

"Smart" appliances are devices that can connect to a network to communicate with other devices while performing a very specific role, for example, within a home or small office. Smart appliances have some specified basic computing processing intelligence but otherwise lack capability of a full-fledged computing system such as a personal computer, phone or tablet. Examples of smart appliances include refrigerators, dishwashers, washers, dryers, thermostats, digital video recorders, DVD players, and printers. By adding a certain level of intelligence to these devices, smart appliances can be made more effective or more convenient for the user. For example, a smart dishwasher might be able to communicate with a smartphone in the local network so the user can start the dishwasher from anywhere in a house. Some smart appliances can be configured to communicate with each other within a local network. For example, a smart television may be configured to receive a video stream from a game console within the network.

However, smart appliances are vulnerable to security breaches that could embed code on the smart appliance that causes it to perform malicious behavior. For example, smart appliances infected with malicious code might be used to perform a Distributed Denial of Service (DDoS) attack on a remote web server or they could be used to send user information to unauthorized recipients. Due to limited access that users have to the functionality of smart appliances, it could be very difficult for a user to determine, on their own, whether a device is performing malicious behavior. Traditional approaches to protect networked devices from malicious code include anti-virus software installed on computers that monitors processes on the computer to determine if those processes might be exhibiting malicious behavior. Anti-virus software is typically installed on full-fledged computing systems such as personal computers, smartphones and tablets. However, smart appliances do not have the computing intelligence or resources to support anti-virus software and often do not allow users to install additional software onto the smart appliance. Therefore, anti-virus software is ill-suited to protect smart appliances from being infected with malicious code.

A network traffic hub can be included in a network to collect data about network traffic to be analyzed to detect malicious behavior. However, in many configurations, some network traffic may not flow through the network traffic hub. For example, if the network traffic hub is configured to physically intercept network traffic between a router and a switch, the network traffic hub would not receive intra-network traffic that travels through the switch only. Data about intra-network traffic can be crucial in determining the presence of malicious behavior in a local network.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A network traffic hub is configured to intercept network traffic between a switch and a router. The network traffic hub can be connected to the switch and the router through a physical or a wireless connection. A smart appliance sends a message to the router, which, in some embodiments, is done when the smart appliance joins the local network, such as a DHCP discover message or a DHCP request message. The network traffic hub intercepts and modifies the response to the message to instruct the smart appliance to send all intra-network traffic through the network traffic hub and the router. In some embodiments, the network traffic hub alters a network mask in the response message to instruct the smart appliance to send traffic through the network traffic hub. The network traffic hub then forwards the response to the smart appliance. The network traffic hub extracts data from the network traffic and uses that data to analyze the behavior of smart appliances in the local network.

Environment Overview

Figure 1:
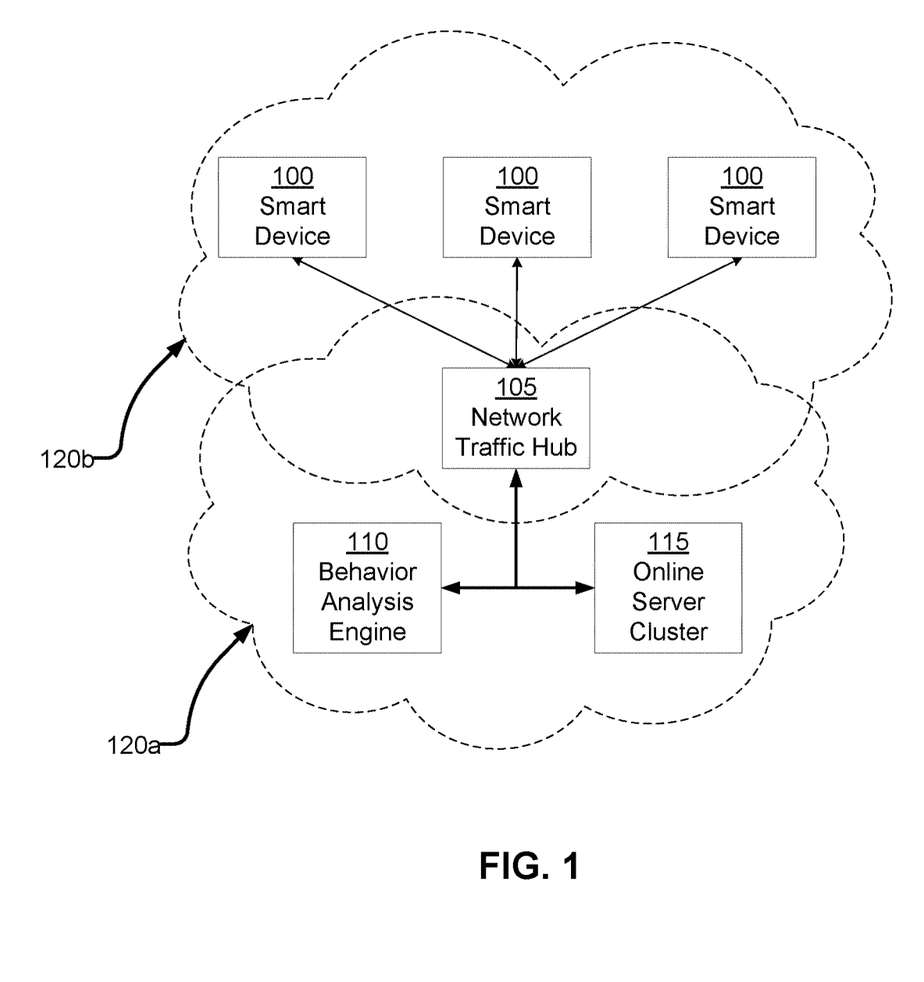
FIG. 1 is a block diagram illustrating a networked computing environment, in accordance with an example embodiment.

FIG. 1 shows a block diagram of a networked computing environment in accordance with an example embodiment.

Functionality of the modules (or engines) illustrated and described in FIG. 1 can be performed by additional, fewer, or different modules and the functionality of the modules can be divvied between modules differently from how it is described below. The networked computing environment in FIG. 1 shows one or more smart appliances 100, a network traffic hub 105, a behavior analysis engine 110, an online server cluster 115, and a cloud network 120a, and a local network 120b. U.S. patent application Ser. No. 14/948,160, filed Nov. 20, 2015, and titled "Network Security Analysis for Smart Appliances" and incorporated by reference herein in its entirety, describes the functionality of the modules in the environment described by FIG. 1, including the network traffic control module 105, in more detail.

Smart appliances 100 are electronic, networked devices with a limited level of intelligence. Smart appliances 100 are capable of performing moderate amounts of computation that is specific, but limited in scope. The smart appliances 100 are not full-fledged computing systems, such as personal computers, smartphones, or tablets. Instead, each smart appliance 100 performs some specific role and the limited intelligence is focused on having the smart appliance 100 perform that specific role effectively. Accordingly, a smart appliance 100 does not have extensive computing resources, e.g., a powerful processor or large quantity of memory. Moreover, keeping computing resources minimal helps keep costs down for the appliances, many of which are staples, for example, in homes or small offices. Examples of appliances that can be smart appliances 100 are refrigerators, freezers, dishwashers, washers, dryers, thermostats, digital video recorders (DVRs), DVD players, and printers. A smart appliance 100 typically includes a controller or low power processor (generally, processor), a limited amount of memory, and a network interface, which is used to communicate with other networked devices.

The architecture of the smart appliances 100 is discussed below. The smart appliances 100 can use the local network 120b to communicate with other devices. For example, a smart dishwasher can be configured to transmit an alert to a computer or a smartphone on the local network 120b that its cleaning cycle is completed. As another example, a smart light switch can be configured to communicate with a motion sensor via the local network 120b to determine if a person is in a room and whether to power the lights in that room. The smart appliances 100 can also communicate with devices outside of local network 120b via the internet. A smart appliance 100 can, for example, be configured to receive software updates from remote servers to improve or update is current control functions. Additionally, a smart appliance might receive data via the internet that it uses to make decisions (e.g. a smart thermostat might receive weather data to determine heating and cooling settings for a building). In some embodiments, a smart appliance 100 can be configured to receive instructions from a remote web server via the internet. For example, a smart clock can be configured to receive an instruction from a known server to change the time it displays when daylight savings starts or ends.

The network traffic hub 105 collects information about the local network 120b, including data about the network traffic through local network 120b and data identifying the smart appliances 100 in the local network 120b. The network traffic hub 105 is also capable of receiving traffic control instructions from the behavior analysis engine 115 and blocking traffic through the local network 120b based on those the traffic control instructions. In some embodiments, the functionality of the network traffic hub 105 is performed by a device that is a part of the local network 120b. In other embodiments, some or all of the functionality of the network traffic hub is performed in the cloud network 120a by the online server cluster 115.

The network traffic hub 105 monitors all traffic that travels through the local network 120b. In some embodiments, the network traffic hub 105 is a device that is a part of the local network 120b. In some embodiments, the network traffic hub 105 can comprise multiple devices in the local network 120b that, in conjunction, monitors all traffic that flows through the local network 120b. In some embodiments, the local network 120b can be structured such that all network traffic passes through the network traffic hub 105, allowing the network traffic hub 105 to physically intercept the network traffic. In these embodiments, the network traffic hub 105 may be positioned between a network router and a network switch in local network 120b. In these cases, the network traffic hub 105 modifies messages between the router and smart appliances 100 to ensure that all network traffic flows through the network traffic hub 105. The method by which the network traffic hub 105 modifies messages between a router and smart appliances 100 is discussed further below.

The behavior analysis engine 110 is configured to receive network traffic data and identification data from the network traffic hub 105. The behavior analysis engine uses that data to determine whether any of the smart appliances 100 in the local network 120b are exhibiting malicious behavior. If the behavior analysis engine 110 is confident that a smart appliance 100 is exhibiting malicious behavior, then the behavior analysis engine 110 sends traffic control instructions to the network traffic hub 105 to block traffic to the smart appliance 100. In some embodiments, the behavior analysis engine 110 is a part of a cloud network 120a and is stored and executed by an online server cluster 115.

The online server cluster 115 is configured to store data, perform computations, and transmit data to other devices through cloud network 120a. The online server cluster 115 may comprise a single computing device, or a plurality of computing devices configured to allow for distributed computations. In some embodiments, the behavior analysis engine 110 is stored and executed by the online server cluster 115. In some embodiments, certain functionality of the network traffic hub 105 is performed on the online server cluster 115. In some embodiments, the online server cluster 115 stores data that is used by the behavior analysis engine 110 and the network traffic hub 105.

The networked computing environment in FIG. 1 can be grouped around the network traffic hub 105. In one example embodiment, the network traffic hub 105 is part of cloud network 120a. In another example embodiment, the network traffic hub 105 is part of a local network 120b. The cloud network 120a comprises the behavior analysis engine 110, the online server cluster 115 and, in some embodiments, the network traffic hub 105. The cloud network 120a is connected to the local network 120b via the internet. In some embodiments, the cloud network 120a comprises the internet. The local network 120b comprises the smart appliances 100. In some embodiments, some or all of the functionality of the network traffic hub 105 is performed by a device in the local network 120b. The local network 120b can be used for a number of purposes, including a home network or a network used by a business. The local network 120b is connected to the internet, allowing devices within the local network 120b, including smart appliances 100, to communicate with devices outside of the local network 120b. The local network 120b is connected to cloud network 120a via the internet. The local network 120b could be a private network that requires devices to present credentials to join the network, or it could be a public network allowing any device to join. In some embodiments, other devices, like personal computers, smartphones, or tablets, may join local network 120b.

Intercepting Intra-Network Traffic

Figure 2:
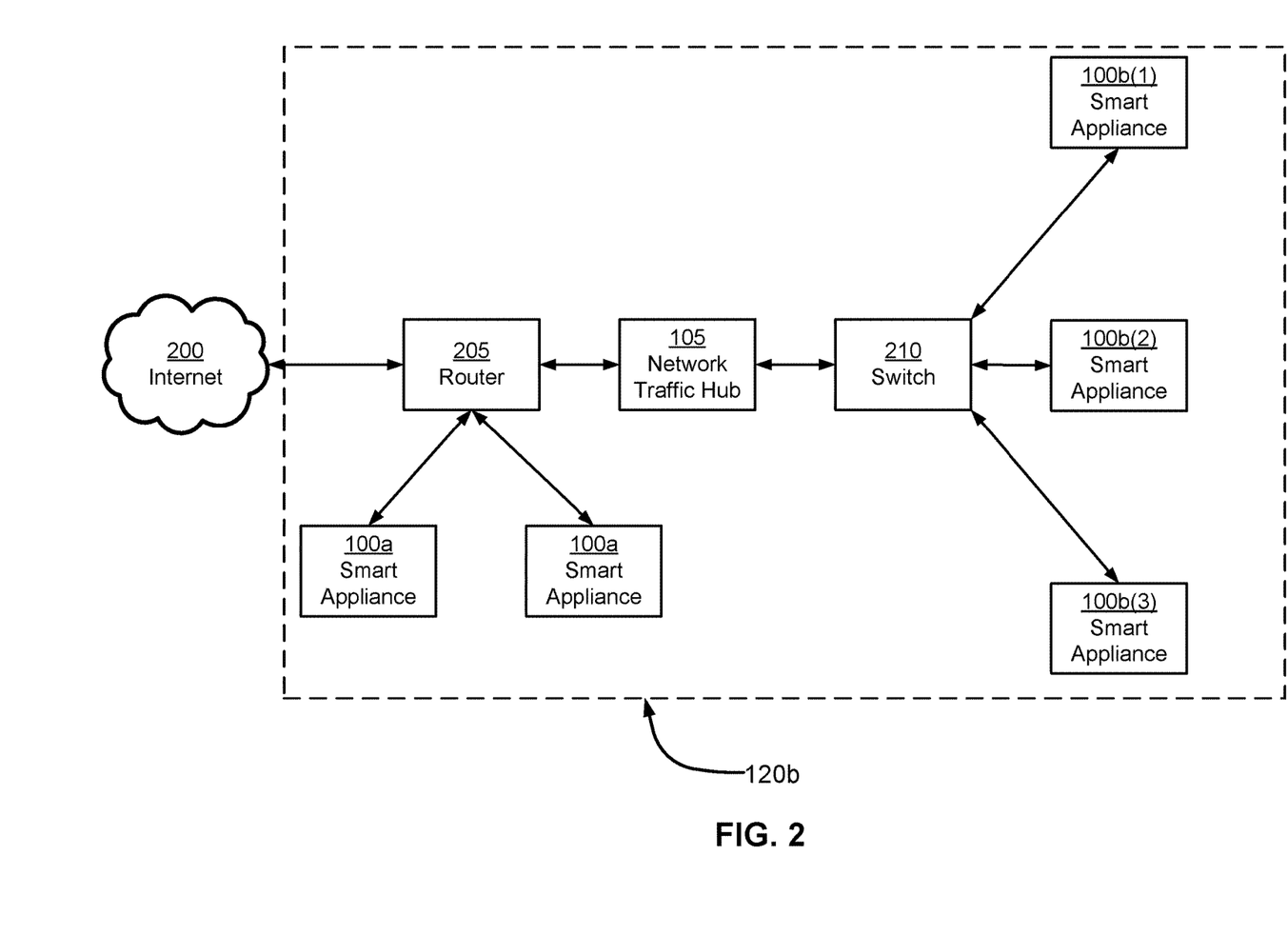
FIG. 2 is a block diagram illustrating the structure of an example local network wherein a network traffic hub is configured to bridge communication between a network router and a network switch, in accordance with an example embodiment.

FIG. 2 is a block diagram illustrating the structure of an example local network wherein a network traffic hub, e.g. 105, is configured to bridge communication between a network router 205 and a network switch 210, in accordance with an example embodiment. The functionality of the modules in FIG. 2 can be performed by additional, fewer, or different modules and the functionality of the modules can be divvied between modules differently from how it is described below. In the embodiment shown, the local network 120b includes smart appliances 100, a network traffic hub 105, the network router 205, and the network switch 210. In some embodiments, the network router 205 can comprise a combination modem/router unit. For example, the network router 205 can be a cable modem device or a satellite receiver device. In some embodiments, the network switch 210 is a wireless access point. In the embodiment shown, the network traffic hub 105 is communicatively coupled to the network router 205 and the network switch 210, the network router 205 is communicatively coupled to smart appliances 100a, and the network switch is communicatively coupled the smart appliances 100b. In some embodiments, the network traffic hub 105 may be communicatively coupled to multiple network switches 210, or the network switch 210 may be communicatively coupled to other network switches 210. The local network connects to the internet 200 through the router 205, allowing the smart appliances 100 in the local network 120b to communicate with devices external to the local network 120b.

The smart appliances 100 can also communicate with smart appliances 100 within the local network 120b. For example, a game console may transmit a video and audio feed to a smart television through the local network 120b. Conventionally, intra-network communication does not always travel through the router 205. For example, if smart appliances 100b were conventionally communicating through the local network 120b, the network traffic would only travel through the network switch 210, and not through the router 205. Therefore, in the configuration presented in FIG. 2, intra-network traffic between smart appliances 100b would not be captured by the network traffic hub 105.

For example, without the disclosed configuration the intra-network traffic between devices may transmit malicious data if one device or another is adversely affected. For example, if a smart appliance 100b(1) is a smart television and smart appliance 100b(2) is a smart gaming console. The smart gaming console 100b(2) may transmit a video stream to the smart television 100b(1) through the network switch 210. In this example, the network traffic hub 105 does not see the intra-network traffic between the smart television 100b(1) and the smart gaming console 100b(2).

Figure 3:
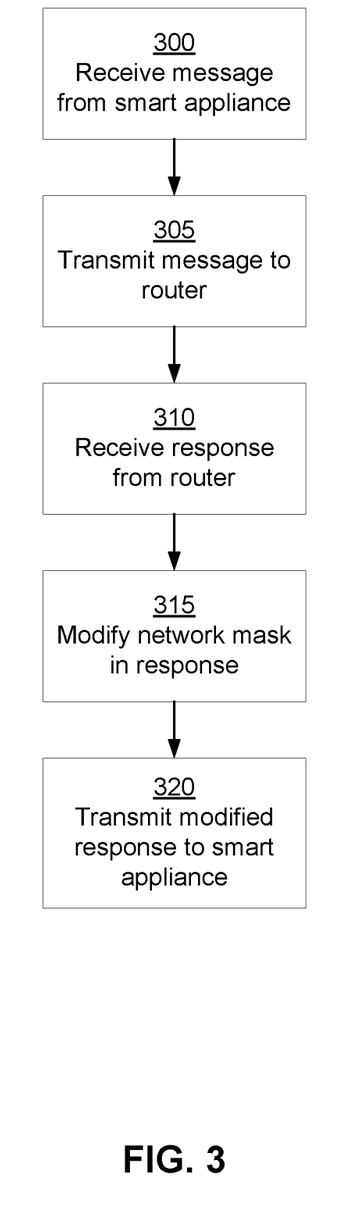
FIG. 3 is a flowchart illustrating a method for intercepting intra-network communication, in accordance with an example embodiment.

FIG. 3 is a flowchart illustrating a method for intercepting intra-network communication, in accordance with an example embodiment. FIG. 3 will be further discussed in the context of FIG. 2. To ensure that network traffic is routed through the network traffic hub 105, the network traffic hub 105 modifies communication between the network router 205 and the smart appliances 100.

The network traffic hub 105 receives a message 300 sent from a smart appliance 100 to the network router 305. In some embodiments, the message is sent by the smart appliance 100 to the network router 205 when the smart appliance 100 joins the local network 120b, or on a regular time interval after joining the local network 120b. In some embodiments, the message is a request from the smart appliance 100 to the router 205 for an internet address within the local network 120b. In some embodiments, the request is a DHCP discover message or a DHCP request message.

After receiving the message from the smart appliance, the network traffic hub 105 transmits 305 the message to the router 205. The network traffic hub 105 then receives 310 a response message from the router 205 to the smart appliance 100. In some embodiments, the response assigns an internet address to the smart appliance. This may be done using the DHCP through a DHCP offer message or a DHCP acknowledge message.

The network traffic hub 105 modifies 310 the response to ensure that the smart appliance 100 will send intra-network traffic through the network traffic hub 105 rather than only through the switch 210. This can be done by modifying the response to instruct the smart appliance 100 to send all intra-network traffic through the router 205, rather than only through the switch 210. In some embodiments, the network traffic hub 105 modifies a network mask in the response to instruct the smart appliance 100 to send intra-network traffic through the router 210. The network traffic hub 105 then transmits 320 the response to the smart appliance 100.

With the disclosed configuration, intra-network traffic is routed through the network traffic hub 105 and therefore malicious traffic between devices on the local area network can be quickly identified and acted upon, e.g., quarantined or blocked. For example, assuming the devices are the appliances noted above, i.e., smart appliance 100b(1) is a smart television and smart appliance 100b(2) is a smart gaming console, the intra-network traffic between the smart television 100b(1) and the smart gaming console 100b(2) would be routed through the network router 205, rather than only through the network switch 210. Therefore, the network traffic hub 105 will see the intra-network traffic and, should the intra-network traffic be malicious, the network traffic hub 105 can take appropriate action on the data traffic, e.g., block or quarantine the intra-network traffic going to and/or transmitted from smart appliances 100.

Architecture of Devices

Figure 4:
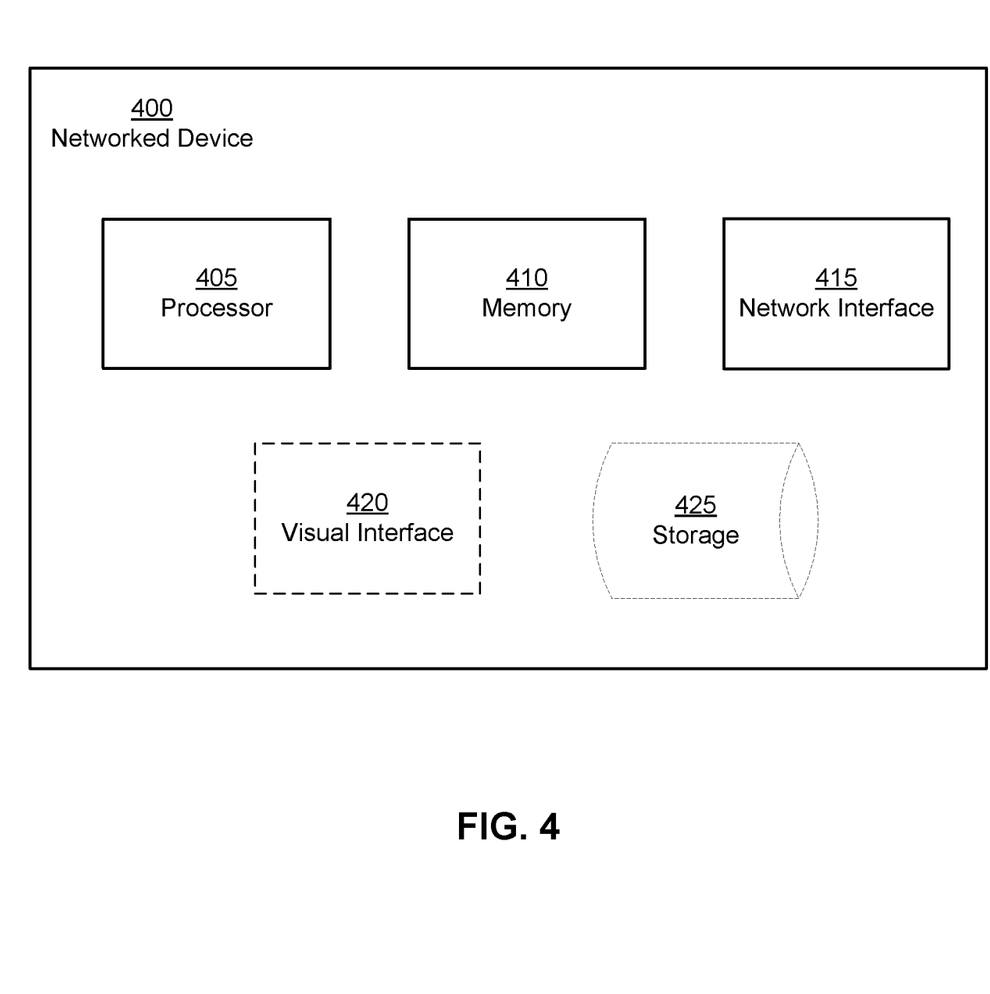
FIG. 4 is a high level block diagram illustrating an example networked device, in accordance with an example embodiment.

FIG. 4 is a high level block diagram illustrating an exemplary networked device. The functionality of the modules in FIG. 4 can be performed by additional, fewer, or different modules and the functionality of the modules can be divvied between modules differently from how it is described below.

A networked device 400 is a device that connects to a network and communicates with other devices via the network. A networked device 400 could be a smart appliance, the network traffic hub 105, or any other device that is connected to either the local network 120b or the cloud network 120a. A networked device 400 has a processor 405 that is used to execute code stored in memory 410. The processor 405 may also send messages to and receive message from the network interface 415 to communicate with other devices. The memory 410 is used by the processor 405 to store data needed by the networked device 400. The memory might be used to hold code that is executed by the processor 405 or could store data that the networked device 400 needs to maintain. The network interface 415 allows the networked device 400 to communicate with other networked devices 400. In some embodiments, a networked device 400 might allow a user to interact with the device 400 via a visual interface 420. In some embodiments, the user interacts with the networked device 400 through the network interface 415. In some embodiments, the networked device 400 might have a storage unit 425 that it uses separately from the memory 410 to store long-term data.

It is noted that a smart appliance and the network hub may include the components shown and described in FIG. 4, but that the individual configurations of processing power, storage, visual interface sophistication, and storage requirements will differ depending on the particular functions as described herein.

Additional Considerations

The method and system as disclosed provides benefits and advantages that includes intercepting intra-network communication without installing specialized software on smart appliances, thereby allowing a smart appliance to join the local network without additional setup. Using this approach also allows the network traffic hub to extract more information about intra-network traffic from communications from smart appliances, thereby giving the network traffic hub more information about the behavior of a smart appliance. In this way, malicious behavior of a smart appliance can be detected more effectively, without significantly impacting the performance of the smart appliance.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1, 2, and 4. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 405, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for intercepting intra-network communication from smart appliances through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   intercepting, at a network traffic hub within a local network, a message from a smart appliance to receive an internet address, the smart appliance being communicatively connected to the local network via a switch and configured to receive information from outside the local network, the message being sent through the switch, the network traffic hub being configured within the local network to intercept network traffic between the switch and a router;
   transmitting, by the network traffic hub, the message from the network traffic hub to the router;
   intercepting, at the network traffic hub, a response from the router, the response comprising an internet address and a netmask;
   modifying the netmask in the response such that subsequent intra-network traffic sent from the smart appliance directly to a second smart appliance within the local network via the switch and without leaving the local network is instead sent to the network traffic hub, the second smart appliance different from the network traffic hub, the switch, and the router;
   transmitting, from the network traffic hub, the response with the modified netmask to the smart appliance;
   receiving, at the network traffic hub, communications from the smart appliance intended for the second smart appliance and forwarding the received communications to a remote server;
   determining, by the network traffic hub, that the smart appliance is exhibiting malicious behavior resulting from embedded malicious code based on an analysis of the received communications, the analysis received from the remote server; and
   in response to determining that the smart appliance is exhibiting malicious behavior resulting from embedded malicious code, quarantining the smart appliance by preventing the communications from being received by the second smart appliance and by blocking subsequent traffic sent from and to the smart appliance.

2. The method of claim 1, wherein the message is one of a DHCP discover message or a DHCP request message.

3. The method of claim 1, wherein the response is one of a DHCP offer message or a DHCP acknowledge message.

4. The method of claim 1, wherein the message is sent to the router through one or more network switches.

5. A non-transitory, computer readable medium comprising computer executable instructions that, when executed, cause a processor to:
   intercept, at a network traffic hub within a local network, a message from a smart appliance to receive an internet address, the smart appliance being communicatively connected to the local network via a switch and configured to receive information from outside the local network, the message being sent through the switch, the network traffic hub being configured within the local network to intercept network traffic between the switch and a router;
   transmit, by the network traffic hub, the message from the network traffic hub to the router;
   intercept, at the network traffic hub, a response from the router, the response comprising an internet address and a netmask;
   modify the netmask in the response such that subsequent intra-network traffic sent from the smart appliance directly to a second smart appliance within the local network via the switch and without leaving the local network is instead sent to the network traffic hub, the second smart appliance different from the network traffic hub, the switch, and the router;
   transmit, from the network traffic hub, the response with the modified netmask to the smart appliance;
   receive, at the network traffic hub, communications from the smart appliance intended for the second smart appliance and forward the received communications to a remote server;
   determine, by the network traffic hub, that the smart appliance is exhibiting malicious behavior resulting from embedded malicious code based on an analysis of the received communications, the analysis received from the remote server; and
   in response to determining that the smart appliance is exhibiting malicious behavior resulting from embedded malicious code, quarantine the smart appliance by preventing the communications from being received by the second smart appliance and by blocking subsequent traffic sent from and to the smart appliance.

6. The computer readable medium of claim 5, wherein the message is one of a DHCP discover message or a DHCP request message.

7. The computer readable medium of claim 5, wherein the response is one of a DHCP offer message or a DHCP acknowledge message.

8. The computer readable medium of claim 5, wherein the message is sent to the router through one or more network switches.

9. A system comprising:
a processor; and
a non-transitory, computer readable medium comprising computer executable instructions that, when executed, cause the processor to:
intercept, at a network traffic hub within a local network, a message from a smart appliance to receive an internet address, the smart appliance being communicatively connected to the local network via a switch and configured to receive information from outside the local network, the message being sent through the switch, the network traffic hub being configured within the local network to intercept network traffic between the switch and a router;
transmit, by the network traffic hub, the message from the network traffic hub to the router;
intercept, at the network traffic hub, a response from the router, the response comprising an internet address and a netmask;
modify the netmask in the response such that subsequent intra-network traffic sent from the smart appliance directly to a second smart appliance within the local network via the switch and without leaving the local network is instead sent to the network traffic hub, the second smart appliance different from the network traffic hub, the switch, and the router;
transmit, from the network traffic hub, the response with the modified netmask to the smart appliance;
receive, at the network traffic hub, communications from the smart appliance intended for the second smart appliance and forward the received communications to a remote server;
determine, by the network traffic hub, that the smart appliance is exhibiting malicious behavior resulting from embedded malicious code based on an analysis of the received communications, the analysis received from the remote server; and
in response to determining that the smart appliance is exhibiting malicious behavior resulting from embedded malicious code, quarantine the smart appliance by preventing the communications from being received by the second smart appliance and by blocking subsequent traffic sent from and to the smart appliance.

10. The system of claim 9, wherein the message is one of a DHCP discover message or a DHCP request message.

11. The system of claim 9, wherein the response is one of a DHCP offer message or a DHCP acknowledge message.

* * * * *